United States Patent
Gwin et al.

(10) Patent No.: US 10,846,010 B2
(45) Date of Patent: Nov. 24, 2020

(54) DATA PORTION ALLOCATION FOR TEMPERATURE MANAGEMENT OF MEMORY DEVICES

(71) Applicant: Intel Corporation, Santa Clara, CA (US)

(72) Inventors: Paul J. Gwin, Orangevale, CA (US); Prasad Alluri, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 19 days.

(21) Appl. No.: 16/219,365

(22) Filed: Dec. 13, 2018

(65) Prior Publication Data

US 2019/0114107 A1     Apr. 18, 2019

(51) Int. Cl.
| | |
|---|---|
| *G06F 3/06* | (2006.01) |
| *G06F 1/20* | (2006.01) |
| *G06F 9/50* | (2006.01) |
| *G06F 12/02* | (2006.01) |

(52) U.S. Cl.
CPC ............ *G06F 3/0649* (2013.01); *G06F 1/206* (2013.01); *G06F 3/0616* (2013.01); *G06F 3/0631* (2013.01); *G06F 3/0653* (2013.01); *G06F 3/0688* (2013.01); *G06F 9/5016* (2013.01); *G06F 9/5094* (2013.01); *G06F 12/0246* (2013.01); *G06F 2206/1012* (2013.01)

(58) Field of Classification Search
None
See application file for complete search history.

(56) References Cited

U.S. PATENT DOCUMENTS

| | | | |
|---|---|---|---|
| 9,811,267 B1* | 11/2017 | Yang ...................... | G06F 3/061 |
| 2008/0151724 A1* | 6/2008 | Anderson ........... | G06F 11/1471 |
| | | | 369/53.42 |
| 2013/0275665 A1* | 10/2013 | Saraswat .................. | G11C 7/04 |
| | | | 711/106 |
| 2013/0282950 A1* | 10/2013 | Bert ...................... | G06F 3/0617 |
| | | | 711/102 |
| 2016/0162219 A1* | 6/2016 | Erez ...................... | G06F 3/0653 |
| | | | 711/103 |
| 2017/0046079 A1* | 2/2017 | Chinnakkonda Vidyapoornachary ...................... | G06F 3/0616 |
| 2017/0249091 A1* | 8/2017 | Hodes ................... | G06F 3/0611 |
| 2017/0371559 A1* | 12/2017 | Higgins ............... | G06F 3/0611 |

(Continued)

*Primary Examiner* — Kaushikkumar M Patel
(74) *Attorney, Agent, or Firm* — Schwabe, Williamson & Wyatt, P.C.

(57) ABSTRACT

Apparatuses, methods, and systems are described herein for a thermal distribution manager to allocate multiple data portions of a data object to be written into a plurality of memory devices, as well as to restore the data object. The thermal distribution manager also reads some of the allocated multiple data portions from the respective memory devices. The allocation may include division of the data object and is based at least in part on respective temperatures of the memory devices prior to a write time and the reading and restoration is based at least in part on respective temperatures of the memory devices prior to a read time. The thermal distribution manager may allocate the multiple data portions according to a frequency of access of a first data portion relative to a frequency of access of a second data portion. Additional embodiments may be described and claimed.

17 Claims, 7 Drawing Sheets

(56) References Cited

U.S. PATENT DOCUMENTS

| | | | |
|---|---|---|---|
| 2018/0165169 A1* | 6/2018 | Camp | G06F 11/2069 |
| 2019/0027193 A1* | 1/2019 | Yuan | G11C 7/24 |
| 2019/0317672 A1* | 10/2019 | Linnen | G06F 3/0635 |
| 2019/0361508 A1* | 11/2019 | Yarragunta | F04D 25/166 |

* cited by examiner

DATA PORTION ALLOCATION FOR TEMPERATURE MANAGEMENT OF MEMORY DEVICES

FIELD

Embodiments of the present disclosure generally relate to the field of integrated circuits (IC), and more particularly, to temperature management of memory devices.

BACKGROUND

A pool of memory devices, such as, e.g., a pool of solid-state memory drives (SSDs), often includes memory devices each operating at various temperatures due to disproportionate platform boundary conditions (e.g., some memory devices may be cooler than others despite the similar or same workloads). Typically, platform fan speed and thus power consumed by the fan is determined by the memory device having the highest current temperature. Accordingly, the fan may cool the memory device with the highest temperature but also unnecessarily cools memory devices having much lower temperatures. For example, a pool of, e.g., 32 memory drives may have a memory drive at a temperature 15° C. higher than remaining memory drives in the pool. Thus, the fans typically draw enough power to cool the highest temperature memory drives, resulting in needless fan power consumption.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
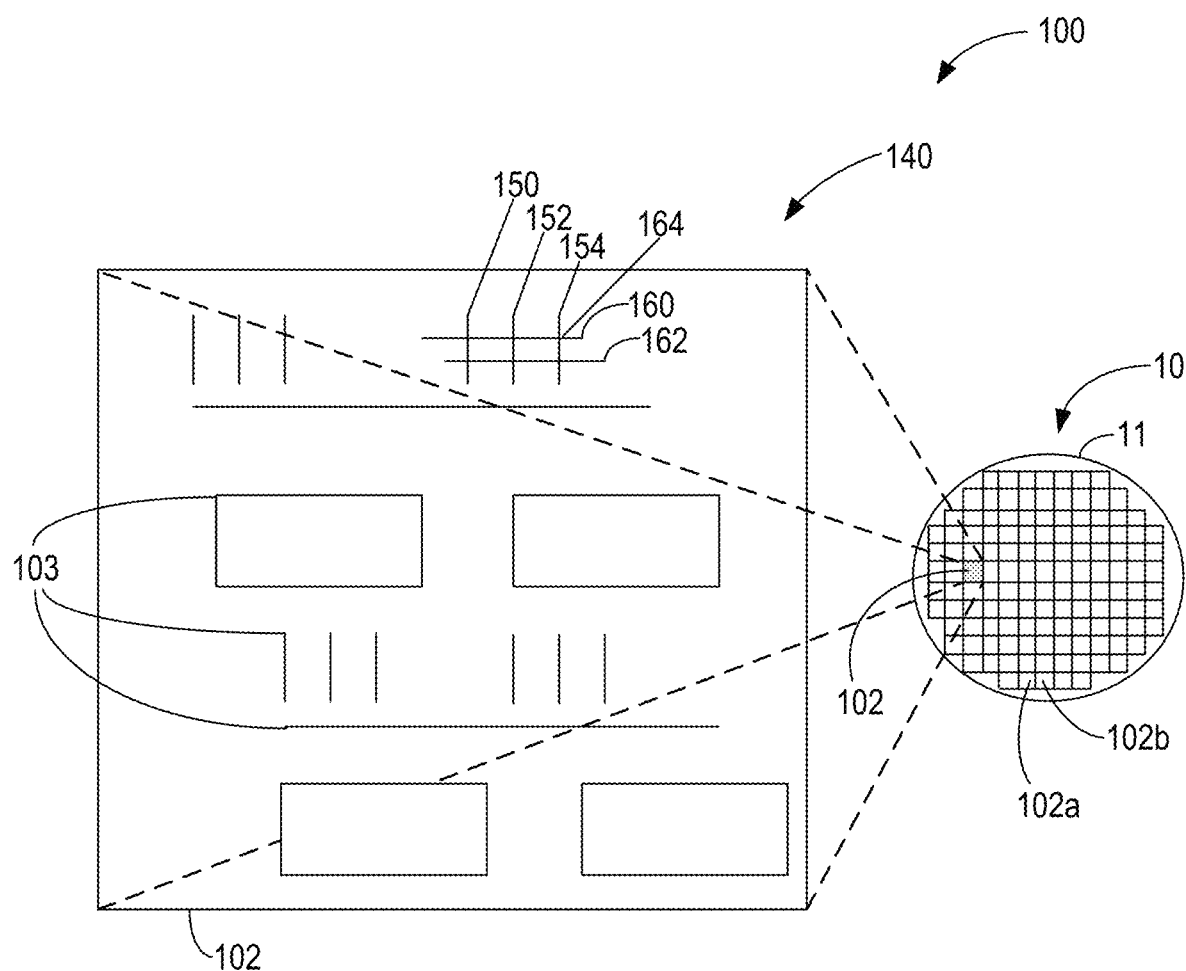
FIG. 1 illustrates an example die in which a memory device may be provided, in accordance with embodiments of the present disclosure.

Embodiments described include methods, apparatuses, and systems including a platform-level thermal distribution manager operatively coupled to a processor to allocate multiple data portions comprising a data object to be written into at least some of a plurality of memory devices, and to restore the data object, including to read at least some of the allocated multiple data portions from the respective memory devices. In embodiments, allocation of the multiple data portions is based at least in part on respective temperatures of the memory devices prior to a write time and the reading of the at least some of the allocated multiple data portions is based at least in part on respective temperatures of the respective memory devices prior to a read time. In embodiments, the allocation is based on various factors including a temperature, location, and/or thermal variance of each of the plurality of memory devices. In embodiments, memory devices having a lower temperature relative to other memory devices in the plurality are allocated data portions associated with a relatively high frequency of access, and memory devices having a higher temperature relative to other memory devices of the plurality are allocated data portions associated with a relatively low frequency of access.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Data objects that are written across a plurality of memory devices, e.g., a pool of solid-state memory drives (SSDs), tend to be written substantially equally across the memory devices, despite differing natural thermal variances of each individual memory device. As a result, platform cooling systems frequently cool memory devices having disproportionately high temperatures related to other memory devices of the plurality. Accordingly, embodiments include apparatuses, methods, and systems directed to allocation of multiple data portions of a data object based at least in part on a temperature and/or a thermal variance of each of the memory devices. In embodiments, the allocation includes strategic division of the multiple data portions. Accordingly, benefits of embodiments are associated with, for example, an increased thermal margin for a plurality of memory devices, higher thermal margins for the memory devices, reduction of memory drive throttling, reduced acoustic emissions, lower fan speeds, and significant reductions in platform and fan power requirements.

FIG. 1 illustrates an example die in which a memory device may be provided using the techniques of the present disclosure, in accordance with some embodiments. More specifically, FIG. 1 schematically illustrates an integrated circuit assembly (IC) assembly 100 including a top view of die 102 in wafer form 10 and in singulated form 140, in accordance with some embodiments. In some embodiments, the die 102 may be one of a plurality of dies (e.g., die 102, 102a, 102b) of a wafer 11 composed of semiconductor material such as, for example, silicon or other suitable material. The plurality of dies may be formed on a surface of the wafer 11. Each of the dies may be a repeating unit of a semiconductor product that may form a memory device. For example, die 102 may include circuitry 103 and/or another memory device module or component as described herein in accordance with some embodiments. According to various embodiments, the circuitry 103 may include one or more memory elements (memory cells, such as, e.g., multi-level per cell memory cells), which may be configured in an array, such as a two-dimensional (2D) or three-dimensional (3D) non-volatile multi-level cell (MLC) memory array. In some embodiments, the memory array may comprise a 2D or 3D multi-level per cell such as three-level-per-cell (TLC) or four-level-per-cell (QLC) NAND memory array. In some embodiments, the memory array comprises a cross-point memory array.

The circuitry 103 may further include one or more wordline(s) (also referred to as "WL" or "WLs") (e.g., 150, 152, 154) and one or more bitline(s) (also referred to as "BL" or "BLs") (e.g., 160, 162) coupled to the memory elements. Only three wordlines and two bitlines are shown in FIG. 1 for ease of understanding. In some embodiments, the bitlines and wordlines may be configured such that each of the memory elements may be disposed at an intersection (e.g., 164) of each individual bitline and wordline (e.g., 160 and 154), in a cross-point configuration. A voltage or bias can be applied to a target memory element of the memory elements using the wordlines and the bitlines to select the target memory cell for a read or write operation. Bitline drivers may be coupled to the bitlines and wordline drivers may be coupled to the wordlines to facilitate decoding/selection of the memory elements. To enable memory cell selection, the wordlines 150, 152, 154 may be connected with memory cells and other parts of circuitry 103 via interconnects, including respective contact structures (e.g., vias) that provide electrical connectivity through the layers of the die 102 as described below in greater detail. It is noted that the circuitry 103 is only schematically depicted in FIG. 1 and may represent a wide variety of suitable logic or memory in the form of circuitry or other suitable devices and configurations including, for example, one or more state machines including circuitry and/or instructions in storage (e.g., firmware or software) configured to perform actions such as read, program, verify and/or analysis operations in connection with data portion allocation for temperature management of memory devices as described herein.

In some embodiments, circuitry 103 may be formed using suitable semiconductor fabrication techniques, some of which are described herein. After a fabrication process of the semiconductor product is complete, the wafer 11 may undergo a singulation process in which each of the dies (e.g., die 102) may be separated from one another to provide discrete "chips" of the semiconductor product. The wafer 11 may be any of a variety of sizes. According to various embodiments, the circuitry 103 may be disposed on a semiconductor substrate in wafer form 10 or singulated form 140. In some embodiments, the die 102 may include logic or memory, or combinations thereof.

Figure 2:
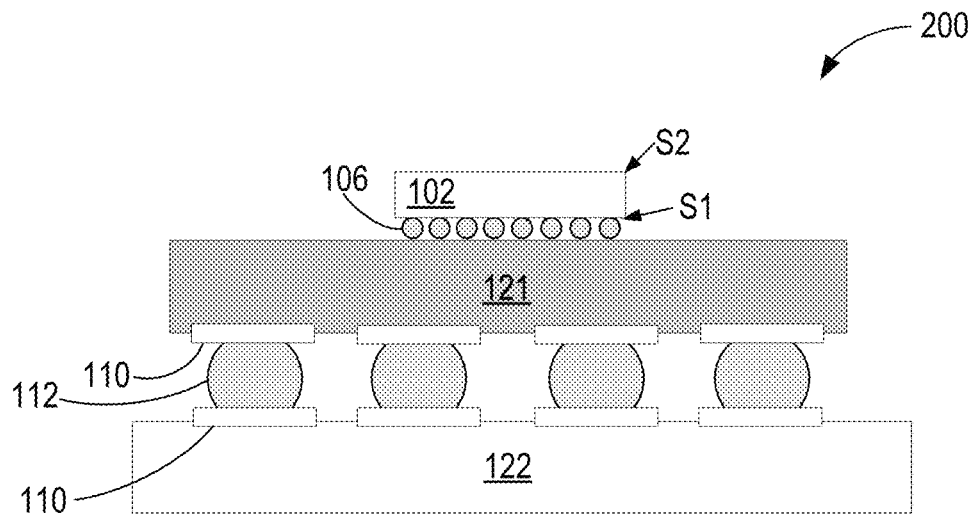
FIG. 2 schematically illustrates a cross-section side view of an integrated circuit (IC) assembly that may be included in a memory device, in accordance with embodiments of the present disclosure.

FIG. 2 schematically illustrates a cross-section side view of an integrated circuit (IC) assembly 200 that may be included in a memory device provided in accordance with some embodiments described herein. In some embodiments, the IC assembly 200 may include one or more dies electrically and/or physically coupled with a package substrate 121. The die 102 may include circuitry (e.g., circuitry 103 of FIG. 1) and/or other suitable components or modules to perform operations in connection with temperature management of a memory device as described herein. In some embodiments, the package substrate 121 is coupled with a circuit board 122, as shown.

The IC assembly 200 may include a wide variety of configurations including, for example, suitable combinations of flip-chip and/or wire-bonding configurations, interposers, multi-chip package configurations including System in Package (SiP) and/or Package on Package (PoP) configurations. For example, the die 102 can be attached to the package substrate 121 according to a wide variety of suitable configurations including, for example, being directly coupled with the package substrate 121 in a flip-chip configuration, as depicted. In the flip-chip configuration, an active side, S1, of the die 102 including active circuitry is attached to a surface of the package substrate 121 using die-level interconnect structures 106 such as bumps, pillars, or other suitable structures that may also electrically couple the die 102 with the package substrate 121. The active side S1 of the die 102 may include circuitry such as, for example, memory elements as described in reference to FIG. 1. An inactive side, S2, may be disposed opposite to the active side S1, as can be seen. In other embodiments, the die 102 may be disposed on another die that is coupled with the package substrate 121 in any of a variety of suitable stacked die configurations. For example, a processor die may be coupled with the package substrate 121 in a flip-chip configuration and the die 102 may be mounted on the processor die in a flip-chip configuration and electrically coupled with the package substrate 121 using through-silicon vias (TSVs) formed through the processor die. In still other embodiments, the die 102 may be embedded in the package substrate 121 or coupled with a die that is embedded in the package substrate 121. Other dies may be coupled with the package substrate 121 in a side-by-side configuration with the die 102 in other embodiments.

In some embodiments, the die-level interconnect structures 106 may be configured to route electrical signals between the die 102 and the package substrate 121. The electrical signals may include, for example, input/output (I/O) signals and/or power/ground signals that are used in connection with operation of the die. The die-level interconnect structures 106 may be coupled with corresponding die contacts disposed on the active side S1 of the die 102 and corresponding package contacts disposed on the package substrate 121. The die contacts and/or package contacts may include, for example, pads, vias, trenches, traces and/or other suitable contact structures, fabrication of some of which is described below.

In some embodiments, the package substrate 121 may comprise an epoxy-based laminate substrate having a core and/or build-up layers such as, for example, an Ajinomoto Build-up Film (ABF) substrate. The package substrate 121 may include other suitable types of substrates in other embodiments including, for example, substrates formed from glass, ceramic, or semiconductor materials.

The package substrate 121 may include electrical routing features configured to route electrical signals to or from the die 102. The electrical routing features may include, for example, package contacts (e.g., pads 110) disposed on one or more surfaces of the package substrate 121 and/or internal routing features (not shown) such as, for example, trenches, vias or other interconnect structures to route electrical signals through the package substrate 121.

In some embodiments, the package substrate 121 may be coupled with a circuit board 122, as can be seen. The circuit board 122 may be a printed circuit board (PCB) composed of an electrically insulative material such as an epoxy laminate. For example, the circuit board 122 may include electrically insulating layers composed of materials that may be laminated together. Interconnect structures (not shown) such as traces, trenches, or vias may be formed through the electrically insulating layers to route the electrical signals of the die 102 through the circuit board 122. The circuit board 122 may be composed of other suitable materials in other embodiments. In some embodiments, the circuit board 122 may be a motherboard and may be included in a computing device, such as, for example, a mobile device. Package-level interconnects such as, for example, solder balls 112 may be coupled to pads 110 on the package substrate 121 and/or on the circuit board 122 to form corresponding solder joints that may be configured to further route the electrical signals between the package substrate 121 and the circuit board 122. The pads 110 may be composed of any suitable electrically conductive material such as metal. The package-level interconnect may include other structures and/or configurations including, for example, land-grid array (LGA) structures and the like. In embodiments, the die 102 of the IC assembly 200 may be, include, or be a part of an IC included in a memory device, such as, e.g., a memory device to receive a data portion allocated by a thermal distribution manager in accordance with embodiments of the disclosure.

Figure 3:
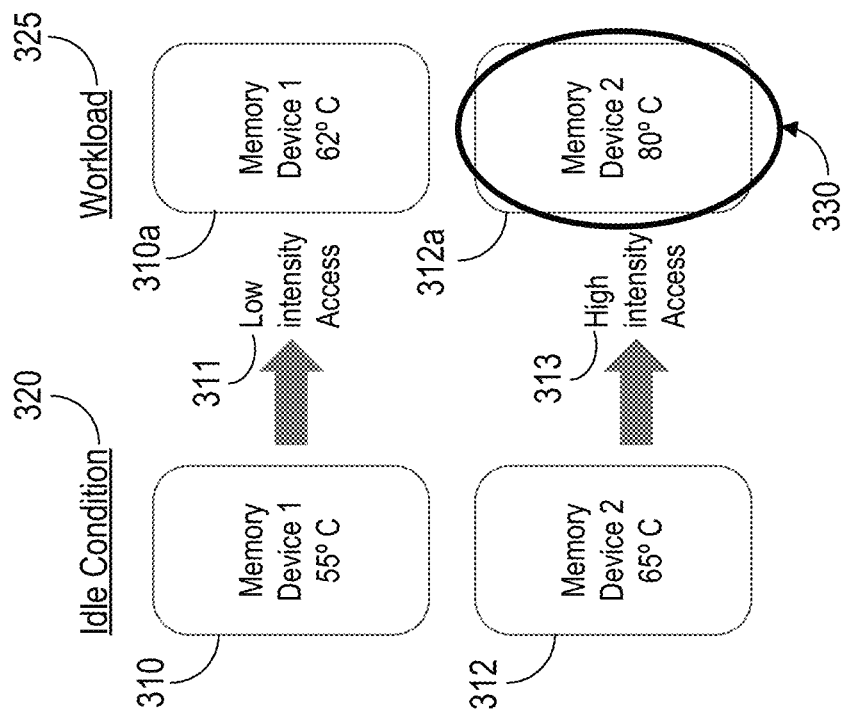
FIGS. 3 and 4 are block diagrams including example memory devices associated with an idle condition and a workload condition, in accordance with embodiments of the present disclosure.

Referring now to FIG. 3, each memory device (hereinafter referred to interchangeably as "SSD") in a plurality of memory devices frequently has a different temperature from the other memory devices due to differences related to a location and/or a natural thermal variance of each memory device. For example, FIG. 3 illustrates temperatures of a first and a second memory device or SSD under an idle condition and subsequently under a randomly assigned workload. As shown, under idle condition 320, first SSD 310 has a temperature of 55° C. while under the same idle condition 320, second SSD 312 has a temperature of 65° C. In other embodiments, similar to an idle condition, during performance of an iso-workload, each SSD may have a different temperature from the other devices. Note that an iso-workload condition is associated with a condition where SSDs in a plurality are given workloads with substantially similar power dissipation; thus each SSD may have a different temperature due to differences related to location and/or a natural thermal variance of the individual SSD.

Returning to FIG. 3, a randomly assigned workload 325 may result in a data object or portions of the data object being randomly striped or written across each of the SSDs of the plurality. Note that a relatively higher frequently accessed data portion ("high intensity data portion") may have a more significant thermal impact on an SSD to which it is written than a less-frequently accessed data portion ("low intensity data portion"). For example, a data object or portion of a data object that is accessed 10 times per hour typically has a greater thermal impact on an SSD than a data object or low intensity data portion that is accessed once per hour. Note that embodiments are associated with any suitable frequency range associated with access to a data object or portion of a data object and that the access examples of 10 times per hour and once per hour are merely illustrative. In FIG. 3, according to a randomly assigned workload, first SSD 310 may be assigned a low intensity data portion and second SSD 312 may be assigned a high intensity data portion. As shown, low intensity access 311 results in an example 7° C. temperature increase from 55° C. to 62° C. in first SSD (e.g., see 310a). High intensity access 313 results in a disproportionately high temperature, rising from 65° C. to 80° C., in second SSD (e.g., see 312a) at 330.

Accordingly, in embodiments, a thermal distribution manager (e.g., a thermal device manager) receives or collects thermal data obtained during various operating conditions. In embodiments, various operating conditions include, e.g., an idle condition or a non-idle condition. Note that in embodiments, a non-idle condition may include platform non-idle conditions such as varying or various fan speeds induced by real platform workloads. In embodiments, information about a natural thermal variance of an SSD can be collected or obtained during an idle condition (e.g., 320) of the plurality of SSDs or during performance of an iso-workload performed by the plurality of SSDs in order to address, e.g., a disproportionately high temperature of SSD 312 indicated at 330. In embodiments, the natural thermal variance is determined by collecting information related to SSD temperatures while varying platform fan speeds induced by increasing platform workloads. In embodiments, platform fan speeds may be elevated by various percentages while an iso-workload is run (or substituted for a real platform workload) to determine SSD natural thermal variance as a function of platform fan speed and natural platform power distribution.

For example, in embodiments, information about an SSD natural thermal variance can be obtained by switching to an iso-workload during performance of a high platform workload scenario, e.g., under a higher fan speed and different flow boundary conditions. In embodiments, such information related to the natural thermal variance of each SSD assists the thermal distribution manager in overall determination of workloads. In various embodiments, the thermal distribution manager dynamically collects and maps each of the temperatures of the SSDs to obtain the information related to a natural thermal variance of each SSD. Note that in embodiments, the thermal distribution manager also collects or receives information related to data object or data portion access frequency. In embodiments, the information can be quantified by logging access cycles and/or duration between access cycles. In embodiments, as, e.g., a data object is logged, data object access frequency is updated.

Figure 4:
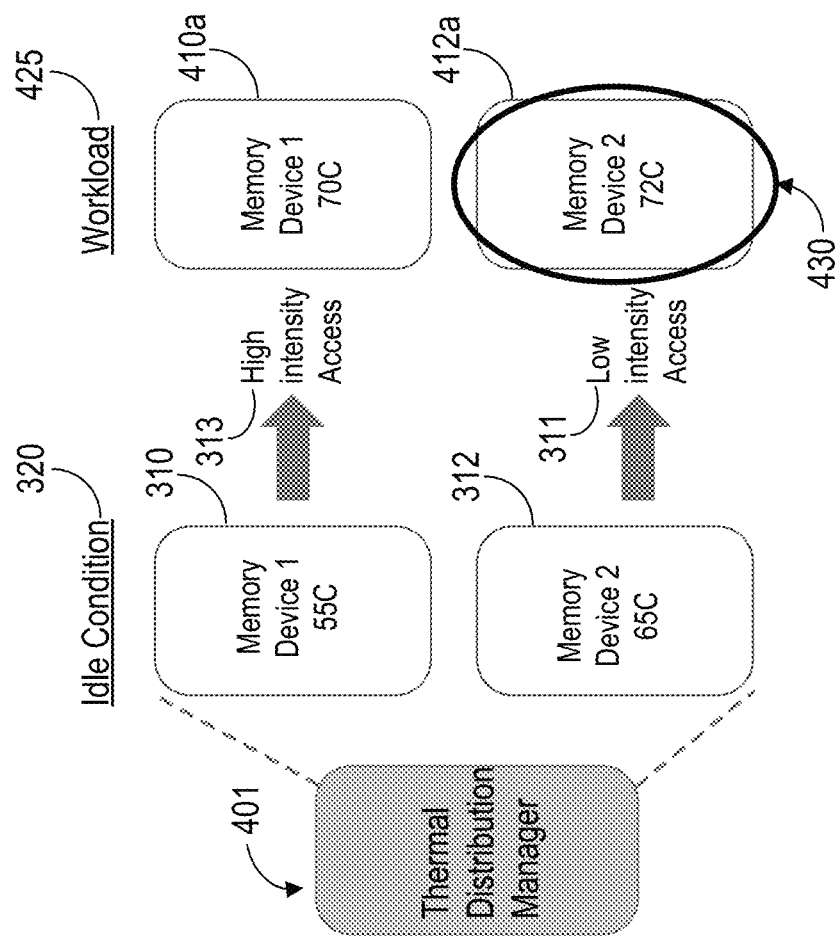

Accordingly, in FIG. 4, in embodiments, using information collected during an idle condition 320, a thermal distribution manager 401 performs an allocation of multiple data portions. Note that the following is merely an example for illustrative purposes and that any examples, e.g., temperatures, magnitudes of increase, deltas, and the like, are not to be limiting of the described embodiments. In some embodiments, the allocation is performed according to a frequency of access of a first data portion relative to a frequency of access of a second data portion. Thus, in embodiments, during an example assigned workload 425, the high intensity or high frequency data portion of FIG. 3 is written on first SSD 310 at 410a and the low frequency data portion is written to second SSD 312 at 412a. Accordingly, high intensity access 313 results in a temperature increase of first SSD 310 to 70° C. at 410a, rather than the 62° C. of FIG. 3. In embodiments, low intensity access 311 increases temperature of second SSD 312 to 72° C. at 430, rather than the 80° C. at 330 of FIG. 3.

Thus, in embodiments, thermal distribution manager 401 is to allocate the multiple data portions based at least in part on information collected related to a natural thermal variance of each of the plurality of SSDs to move the plurality of SSDs towards an isothermal condition. In embodiments, the information collected is related to the natural thermal variance and includes information collected during an idle condition of the plurality of SSDs or during performance of an iso-workload performed by the plurality of SSDs. In some embodiments, the information is collected during performance of an assigned workload (e.g., where the multiple data portions have been allocated in accordance with embodiments). Accordingly, in embodiments, a cooling method of a platform, e.g., a fan, consumes less power as it cools a plurality of SSDs that are in a relatively iso-thermal temperature range of 70-72° C. rather than a temperature range of 62-80° C. Note that such temperature ranges are merely examples provided for illustrative purposes and embodiments may be associated with any suitable temperature or temperature range associated with SSD operation. Furthermore, in embodiments, the thermal distribution manager allocates a data portion associated with a relatively higher frequency access to an SSD with a relatively lower temperature (and/or lower thermal variance). Accordingly, a data portion associated with a relatively lower frequency of access is allocated to an SSD with a higher temperature (and/or higher thermal variance).

As noted above, the temperatures of the first and second SSDs given in FIGS. 3 and 4 are merely examples provided to illustrate embodiments wherein a thermal distribution manager obtains temperature or other information and allocates the multiple data portions based at least in part on the information. In various embodiments, the temperatures of each of a plurality of SSDs may correspond to any suitable temperatures associated with idle conditions, randomly assigned, or assigned workloads.

Figure 5:
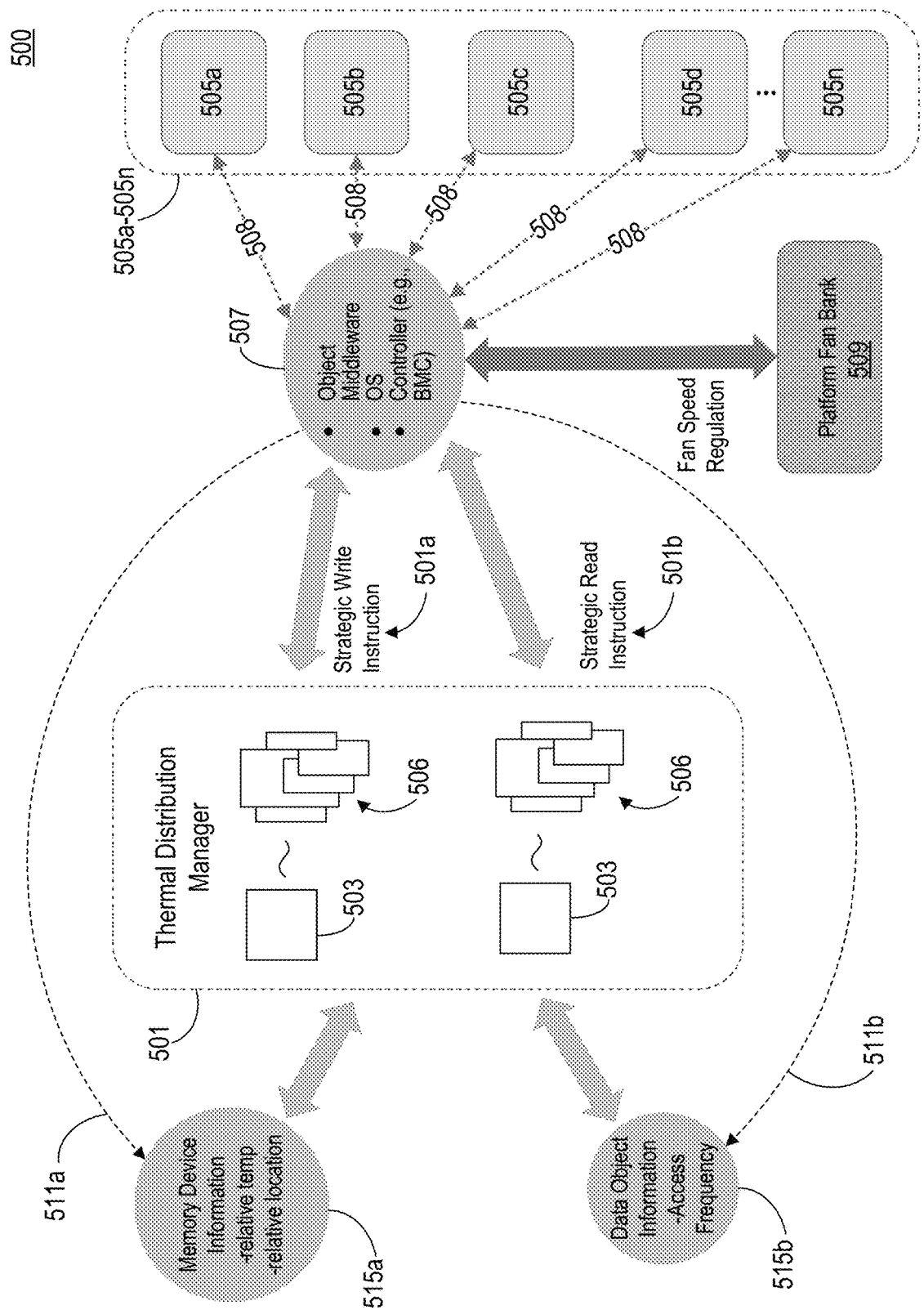
FIG. 5 is a diagram illustrating a platform associated with a thermal distribution manager and a plurality of memory devices, in accordance with embodiments of the present disclosure.

FIG. 5 is a diagram 500 illustrating a platform associated with a thermal distribution manager and a plurality of SSDs, according to embodiments of the present disclosure. In embodiments, a thermal distribution manager 501 allocates multiple data portions 506 of a data object 503 to be written into at least some of a plurality of SSDs 505a-505n, and restores data object 503, which includes to read at least some of the allocated multiple data portions 506 from the respective SSDs. In embodiments, thermal distribution manager 501 receives data or SSD information 515a and data object information 515b and is coupled to provide a strategic write instruction 501a and a strategic read instruction 501b to a platform memory interface 507. In embodiments, platform memory interface 507 is coupled to provide read and write commands 508 to write and read the data portions to/from each of plurality of SSDs 505a-505n. Furthermore, platform memory interface may control platform fan bank 509 to cool SSDs 505a-505n that have received the allocated data portions. In various embodiments, platform memory interface 507 includes or is included in an object middleware, operating system (OS), or controller. In embodiments, e.g., a baseboard management controller (BMC) may be associated with various functions. In embodiments, the BMC includes a fan controller and may take instruction or command from platform memory interface 507 and/or thermal distribution manager 501. In some embodiments, platform memory interface 507 includes thermal distribution manager 501. In embodiments, platform memory interface 507 is coupled to receive SSD information from each of plurality of SSDs 505a-505n (e.g., temperature or other sensor information). In embodiments, platform memory interface 507 is coupled to provide (e.g., arrows 511a and 511b) at least some of SSD information 515a and a data object information 515b to thermal distribution manager 501. In some embodiments, information 515a and 515b are received or collected by thermal distribution manager 501 dynamically in real time.

In embodiments, SSD information 515a includes information related to a thermal variance of each of the plurality of SSDs including, e.g., an SSD temperature and/or location. In embodiments, thermal distribution manager 501 is to allocate the multiple data portions 506 based at least in part on a natural thermal variance of each of the SSDs. In embodiments, the natural thermal variance is determined based at least in part on information obtained during conditions associated with various platform fan speeds induced by various platform workloads.

In embodiments, data object information 515b includes data object access frequency. In some embodiments an allocation of higher frequency data portions and the lower frequency data portions include a corresponding different first and a second subset of the plurality of SSDs and upon a read request, the data object is to be read from the first or the second subset based on respective temperatures of the SSDs in the first and the second subset of the plurality of SSDs. As further discussed below, in some embodiments, data object frequency is related to whether a data portion of a data object is related to parity restore thus is less frequently accessed.

Figure 6:
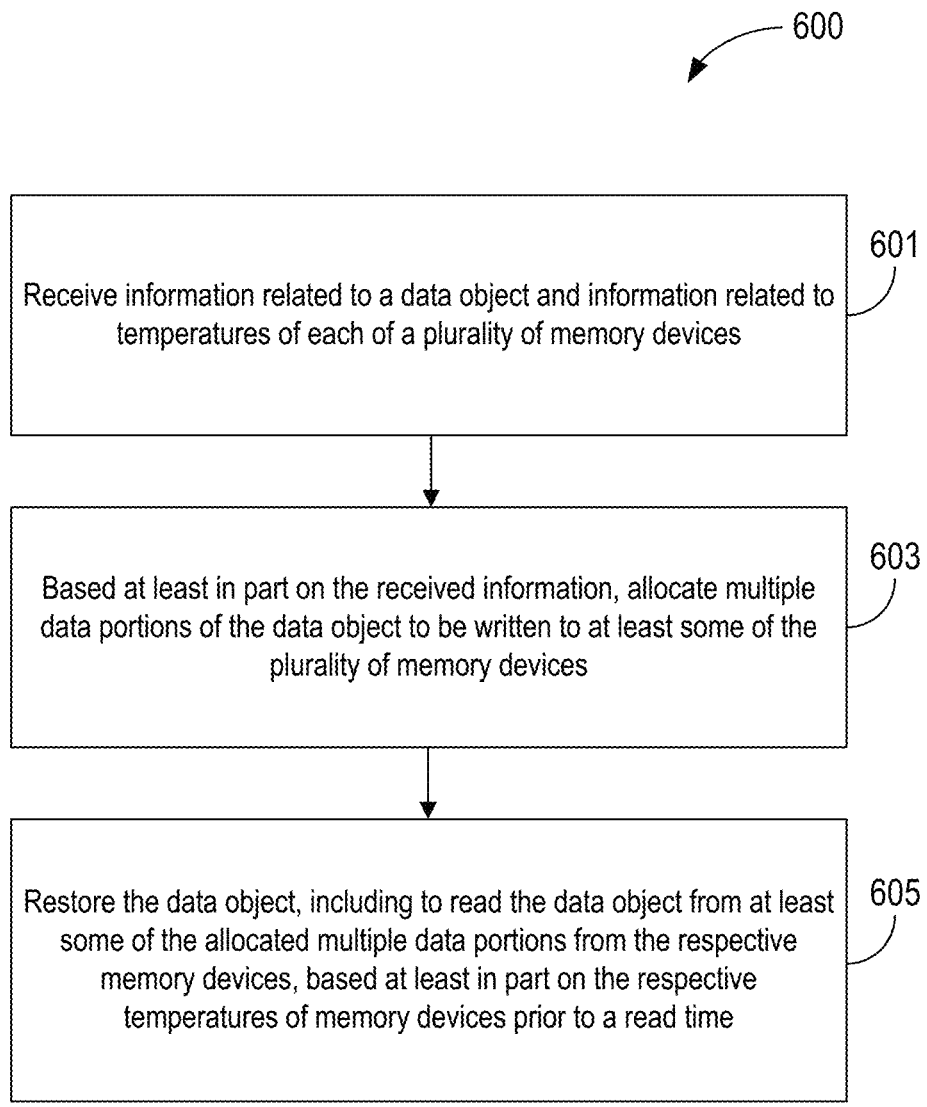
FIG. 6 is a flow diagram associated with embodiments of FIGS. 3-5, in accordance with embodiments of the present disclosure.

FIG. 6 is a flow diagram 600 illustrating an example process that is performed by a thermal distribution manager operable by a processor or processor of the platform device (hereinafter "platform device") in accordance with embodiments of the present disclosure. In embodiments, beginning at a block 601, the platform device receives or collects information related to temperatures of the SSDs (e.g., information 515a) and information related to a data object (e.g., information 515b). As noted above, in embodiments, information related to the temperatures includes information collected dynamically and includes information related to a natural thermal variance of each of the SSDs, and information related to the data object includes data object access frequency. In embodiments, at a next block 603, based on the received information, the thermal platform device allocates multiple data portions to be written to at least some of the plurality of SSDs. In embodiments, the allocation is in response to a write request and the allocation is based at least in part on respective temperatures of the SSDs prior to a write time.

In embodiments, to allocate the multiple data portions includes to divide the data object into data portions that are associated with a higher frequency access and data portions that are accessed with a lower frequency access. In embodiments, the higher frequency data portions and the lower frequency data portions include a corresponding different first and a second subset of the plurality of SSDs and upon a read request, the data object is to be read from the first or the second subset based on respective temperatures of the SSDs in the first and the second subset of the plurality of SSDs.

Note that in some embodiments, data portions that are associated with restoration and correction of a data object, due to less frequent access, are allocated to a subset of SSDs associated with higher temperatures relative to other SSDs of the plurality. For example, in embodiments, the thermal platform device divides a data object into "n" number of data portions where a number of data portions needed to restore the data object is less than "n." In embodiments, if a parity check fails, then up to "n" data portions are read to restore and/or correct the data object. To further illustrate, in some embodiments, the thermal platform device divides a data object into, e.g., 12 data portions where only 8 data portions are needed to retrieve the data object. In the example embodiment, the other 4 data portions are reserved for data restore or correction. Thus, for example, 1-4 data portions are accessed to restore the data object only when retrieval of the first 8 data portions has resulted in a parity failure. Thus, in the embodiment, 8 data portions are allocated as high frequency data portions and the 4 data portions are allocated as low frequency data portions.

Returning to flow diagram 600, in embodiments, at a next block 605, the platform device restores the data object. In embodiments, the restoration is in response to a read request. In embodiments the restoration includes to read the data object from at least some of the allocated multiple data portions from the respective SSDs. In some embodiments, the restoration is based at least in part on respective temperatures of the respective SSDs prior to a read time. In embodiments, the platform device reads the data object from SSDs that have lower temperatures, prior to a read time, relative to temperatures of other SSDs of the plurality.

Figure 7:
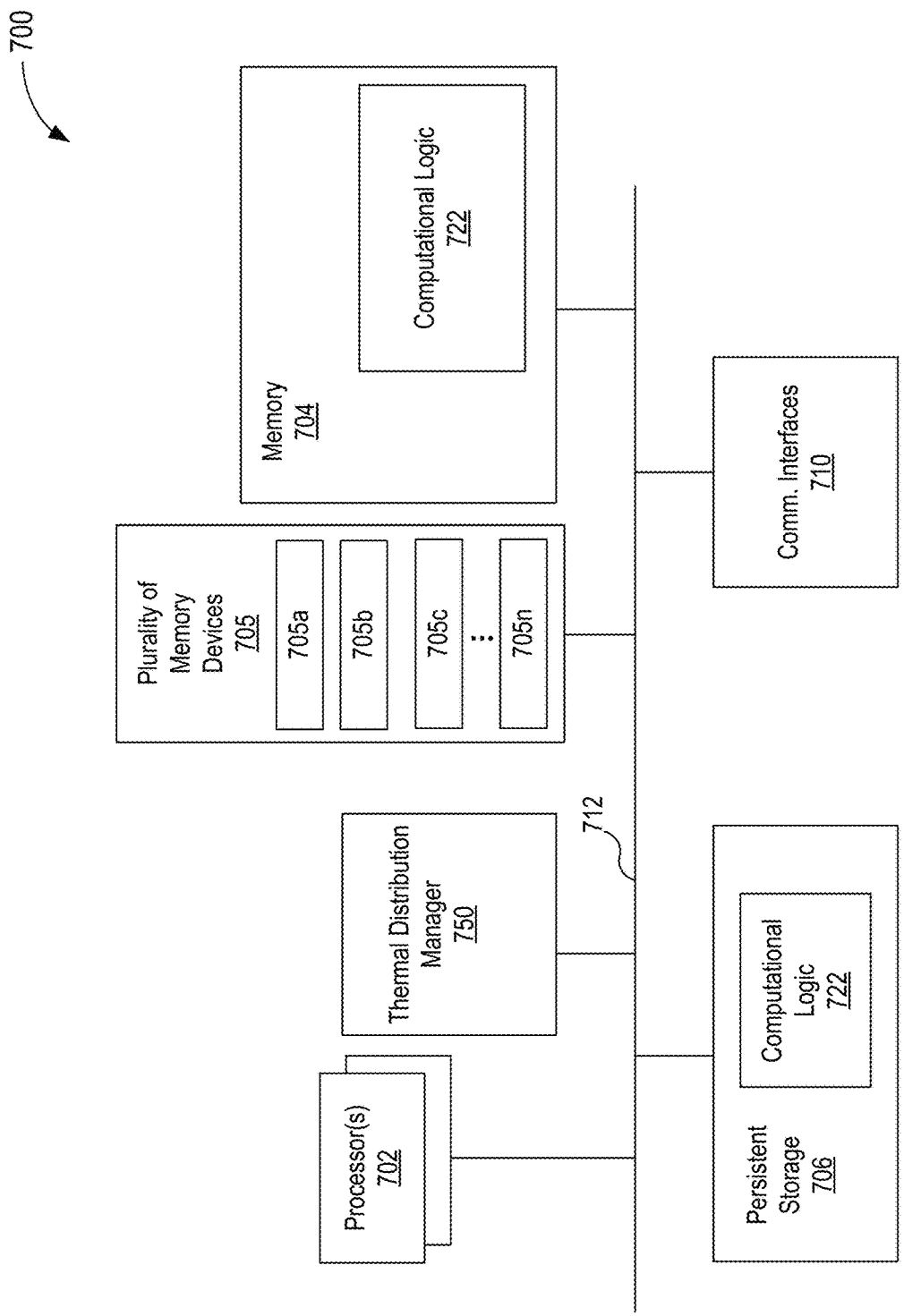
FIG. 7 is a schematic of a computing system, in accordance with embodiments of the present disclosure.

FIG. 7 illustrates an example computer system or computer device 700 that may include components corresponding to and/or implementing various components and methods of FIGS. 1-6, such as a thermal distribution manager and a plurality of SSDs to receive a data portion allocation, e.g., a data portion allocation or strategic data portion allocation, as described with respect to FIGS. 1-6, in accordance with various embodiments. As shown, computer device 700 may include one or more processors 702, each having one or more processor cores, and system memory 704. The processor 702 may include any type of processors, and may include single or multi-core microprocessors, and the like. The processor 702 may be implemented as an integrated circuit in various embodiments. The computer device 700 may include persistent storage devices 706. In general, system memory 704 and/or persistent storage devices 706 may be temporal and/or persistent storage of any type, including, but not limited to, non-volatile memory, optical, magnetic, and/or solid-state mass storage, and so forth. Non-volatile memory may include, but is not limited to, electrically erasable programmable read-only memory, phase change memory, resistive memory, and so forth.

Computer device 700 includes a thermal distribution manager 750 coupled to a plurality of memory devices of SSDs 705 including SSDs 705a-705n. In embodiments, persistent storage 706 also may include plurality of SSDs 705 including SSDs 705a-705n. In embodiments, thermal distribution manager 750 is operatively coupled to the processor 702 to receive information related to a data object and information related to a temperature of each of the plurality of SSDs 705a-705n, and based at least in part on the information related to the data object and the information related to the temperature of each of the plurality of SSDs 705a-705n, allocate multiple data portions of the data object to be written to at least some of the plurality of SSDs 705a-705n. In embodiments, thermal distribution manager 750 is to restore the data object, wherein to restore the data object includes to read the data object from at least some of the allocated multiple data portions from the respective SSDs 705a-705n, wherein the allocation of the multiple data portions is based at least in part on respective temperatures of the SSDs prior to a write time, and the reading of the at least some of the allocated data portions is based at least in part on respective temperatures of the SSDs 705a-705n prior to a read time.

Accordingly, in some embodiments, plurality of SSDs 705 includes a plurality of solid-state memory drives (SSD). In some embodiments, plurality of SSDs 705a-705n include NAND flash SSDs. In some embodiments, the SSDs include 3D XPOINT™ memory devices. The computer device 700 may further include communication interfaces 710 (such as network interface cards, modems, infrared receivers, radio receivers (e.g., Bluetooth), and so forth). The communication interfaces 710 may include communication chips (not shown) that may be configured to operate the computer device 700 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be conFIG.d to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 710 may operate in accordance with other wireless protocols in other embodiments. In some embodiments, the communication interfaces 710 may operate in accordance with one or more wired networking protocols. In some embodiments, the communication interfaces 710 may operate via one or more LAN ports and/or one or more WAN ports.

The above-described computer device 700 elements may be coupled to each other via system bus 712, which may represent one or more buses. In the case of multiple buses, they may be bridged by one or more bus bridges (not shown). Each of these elements may perform its conventional functions known in the art. In particular, system memory 704 and persistent storage devices 706 may be employed to store a working copy and a permanent copy of the programming instructions, such as drivers, for the operation of various components of computer device 700, including but not limited to operation of the thermal distribution manager 750, an operating system of computer device 700 (which may include thermal distribution manager), and/or one or more applications, collectively referred to as computational logic 722. The various elements may be implemented by assembler instructions supported by processor(s) 702 or high-level languages that may be compiled into such instructions. In embodiments, persistent storage devices 706 also include some or more of plurality of SSDs 705.

The permanent copy of the programming instructions may be placed into persistent storage devices 706 in the factory or in the field through, for example, a distribution medium (not shown), such as a compact disc (CD), or through communication interface 710 (from a distribution server (not shown)). That is, one or more distribution media having an implementation of the agent program may be employed to distribute the agent and to program various computing devices.

For some embodiments, at least one of processors 702 may be packaged together with a storage medium having all or portions of computational logic 722 configured to facilitate aspects of embodiments described herein to form a System in Package (SiP) or a System on Chip (SoC).

In various embodiments, a data decoder/encoder (not shown) coupled to bus 712 of a gateway may comprise a coder-decoder (codec) configured to encode, decode or transcode video data in accordance with a Motion Picture Experts Group-2 (MPEG-2), H.264 Advanced Video Coding (H264/AVC), H.265 High Efficiency Coding (H265/HEVC), VP9, VC-1 or Motion JPEG (MJPEG) video compression standard or any other suitable video compression standard.

In various implementations, the computing device 700 may be a data center, a laptop, a netbook, a notebook, an ultrabook, a smartphone, a tablet, a personal digital assistant (PDA), an embedded computer device, an ultra mobile PC, a mobile phone, a desktop computer, a server, a printer, a scanner, a monitor, a set-top box, an entertainment control unit, a digital camera, or a digital video recorder. In further implementations, the computing device 700 may be any other electronic device that processes data.

Figure 8:
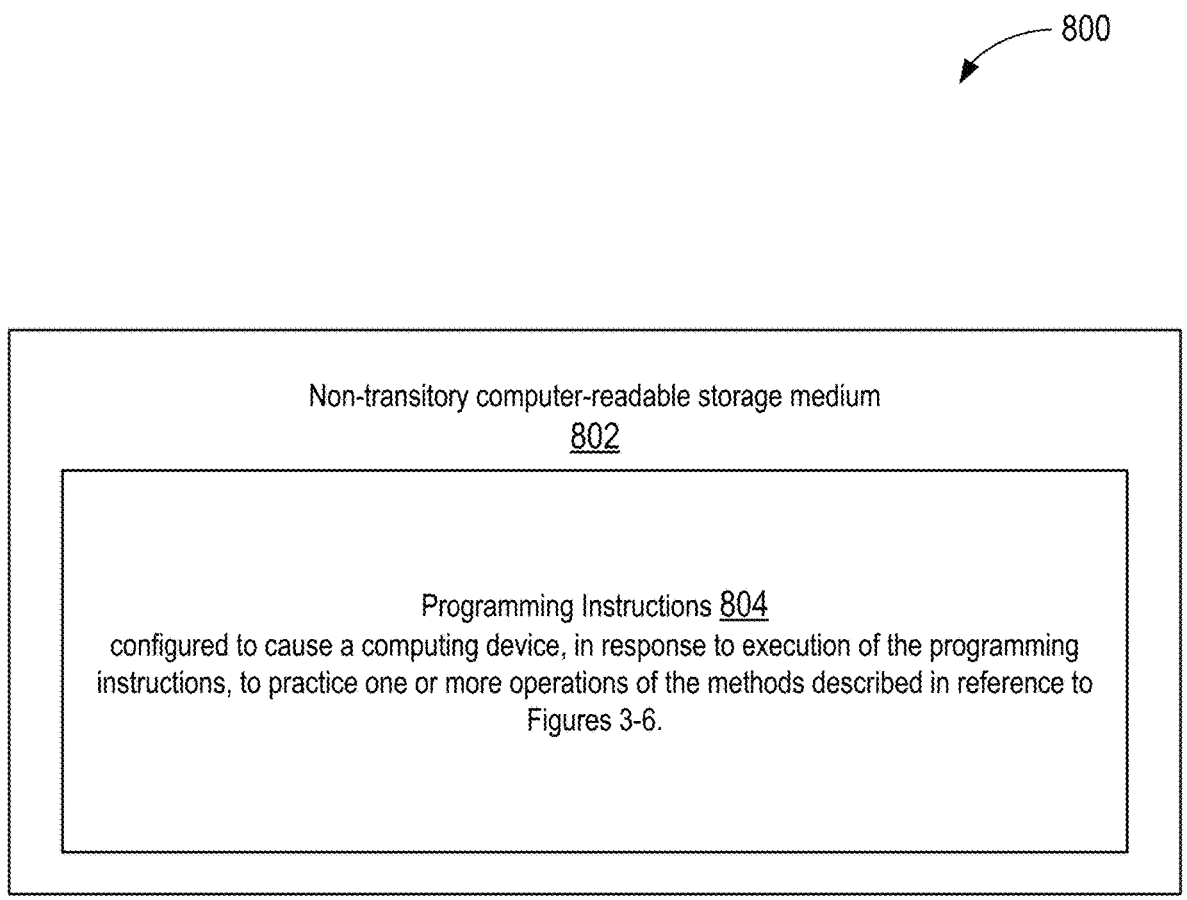
FIG. 8 illustrates an example storage medium with instructions configured to practice the present disclosure, in accordance with various embodiments.

Furthermore, the present disclosure may take the form of a computer program product embodied in any tangible or non-transitory medium of expression having computer-usable program code embodied in the medium. FIG. 8 illustrates an example computer-readable non-transitory storage medium 800 that may be suitable for use to store instructions that cause an apparatus, in response to execution of the instructions by the apparatus, to practice selected aspects of the present disclosure. As shown, non-transitory computer-readable storage medium 802 may include a number of programming instructions 804. Programming instructions 804 may be configured to enable a device, e.g., host or platform device and/or including a memory interface, in response to execution of the programming instructions to perform, e.g., various operations as discussed in FIGS. 1-6.

For example, programming instructions 804 may include one or more non-transitory computer-readable media (CRM) including instructions that cause a platform device, in response to execution of the instructions by the platform device, to receive information related to a data object and information related to temperatures of each of a plurality of SSDs and based at least in part on the information related to the data object and the information related to temperatures of each of the plurality of SSDs, allocate multiple data portions of the data object to be written to at least some of the plurality of SSDs. Upon a read instruction, the instructions may cause the platform device to restore the data object, wherein to restore the data object includes to read the data object from at least some of the allocated multiple data portions from the respective SSDs, wherein the allocation of the multiple data portions is based at least in part on respective temperatures of the SSDs prior to a write time and the reading of the at least some of the allocated data portions is based at least in part on respective temperatures of the SSDs prior to a read time.

In embodiments, the one or more CRM comprise instructions to cause a platform device to prioritize an SSD available for allocation of a data portion according to a temperature of the SSD relative to other SSDs of the plurality to move the plurality of SSDs towards an isothermal condition. In embodiments, the instructions to cause the platform device to allocate the multiple data portions include instructions to allocate data portions associated with a higher frequency of access to an SSD associated with a lower natural temperature variance and data portions associated with a lower frequency of access to an SSD associated with a higher natural temperature variance. In embodiments, the instructions are to cause the platform device to collect information related to a natural thermal variance of each of the plurality of SSDs, wherein the information is collected by inducing increased platform fan speeds and increased platform workloads.

For example, in embodiments, the thermal distribution manager writes data portions of a data object across the plurality of SSDs to allow the data object to be read from a first subset of SSDs or a second set of SSDs. In embodiments, whether the data object is to be read from the first subset or the second subset is based in part on information related to temperatures of the first or the second subset of SSDs. In some embodiments, the thermal distribution manager to allocate the multiple data portions includes instructions to divide the data object into a first subset of data portions having a relatively higher frequency of access and a second subset of data portions having a relatively lower frequency of access, wherein the subsets of data portions associated with the relatively lower frequency access are associated with a parity restore.

In alternate embodiments, programming instructions 804 may be disposed on multiple computer-readable non-transitory storage media 802 instead. In alternate embodiments, programming instructions 804 may be disposed on computer-readable transitory storage media 802, such as signals. Any combination of one or more computer-usable or computer-readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, radiofrequency (RF), etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

According to various embodiments, the present disclosure describes a number of examples.

Example 1 is an apparatus comprising a thermal distribution manager to allocate multiple data portions comprising a data object to be written into at least some of the plurality of memory devices, and to restore the data object, which includes to read at least some of the allocated multiple data portions from the respective memory devices, wherein the allocation of the multiple data portions is based at least in part on respective temperatures of the memory devices prior to a write time and the reading of the at least some of the allocated multiple data portions is based at least in part on respective temperatures of the memory devices prior to a read time.

Example 2 is the apparatus of Example 1, wherein the thermal distribution manager comprises a processor operatively coupled to the plurality of memory devices.

Example 3 is the apparatus of claim 2, wherein the plurality of memory devices comprises a plurality of solid state memory drives (SSDs) and the thermal distribution manager is to perform the allocation of the multiple data portions in response to a write request and to restore the data object in response to a read request.

Example 4 is the apparatus of Example 3, wherein the thermal distribution manager is to perform the allocation of the multiple data portions according to a frequency of access of a first data portion relative to a frequency of access of a second data portion.

Example 5 is the apparatus of Example 1, wherein the thermal distribution manager to allocate the multiple data portions includes to divide the data object into data portions that are accessed with a relatively higher frequency and data portions that are accessed with a relatively lower frequency.

Example 6 is the apparatus of Example 5, wherein the higher frequency data portions and the lower frequency data portions are allocated across the plurality of memory devices to be read from a first subset of memory devices or a second set of memory devices.

Example 7 is the apparatus of Example 1, wherein the thermal distribution manager is to allocate the multiple data portions based at least in part on a natural thermal variance of each of the plurality of memory devices and wherein the natural thermal variance is determined based at least in part on information obtained during conditions associated with varying platform fan speeds induced by corresponding varying platform workloads.

Example 8 is the apparatus of Example 7, wherein the conditions associated with the varying platform fan speeds include increasing platform fan speeds accompanied by substitution or running of an iso-workload in place of a real platform workload.

Example 9 is any one of the apparatuses of Examples 1-7, wherein the thermal distribution manager dynamically collects and maps each of the temperatures of the memory devices to obtain the information related to the natural thermal variance.

Example 10 is one or more non-transitory computer-readable media (CRM) comprising instructions that cause a platform device, in response to execution of the instructions by the platform device, to receive information related to a data object and information related to temperatures of each of a plurality of memory devices; based at least in part on the information related to the data object and the information related to temperatures of each of the plurality of memory devices, allocate multiple data portions of the data object to be written to at least some of the plurality of memory devices; and restore the data object, wherein to restore the data object includes to read the data object from at least some of the allocated multiple data portions from the respective memory devices, wherein the allocation of the multiple data portions is based at least in part on respective temperatures of the memory devices prior to a write time and the reading of the at least some of the allocated data portions is based at least in part on respective temperatures of the memory devices prior to a read time.

Example 11 is the one or more CRM of Example 10, wherein the instructions are to further cause the platform device to collect information related to a natural thermal variance of each of the plurality of memory devices, wherein the information is collected by inducing increased platform fan speeds and increased platform workloads.

Example 12 is the one or more CRM of Example 10, further comprising instructions to cause the platform device to prioritize a memory device available for allocation of a data portion according to a temperature of the memory device relative to other memory devices of the plurality to move the plurality of memory devices towards an isothermal condition.

Example 13 is the one or more CRM of Example 11, wherein the instructions to cause the platform device to allocate the multiple data portions include instructions to divide the data object into a first subset of data portions having a relatively higher frequency of access and a second subset of data portions having a relatively lower frequency of access, wherein the subsets of data portions associated with the relatively lower frequency access are associated with a parity restore.

Example 14 is the one or more CRM of any one of Examples 11-13, wherein the instructions further include instructions to cause the platform device to issue instructions to read the data object from a subset of a plurality of memory devices having a lower temperature relative to a subset of memory devices having a higher temperature.

Example 15 is a system, comprising a processor, a plurality of memory devices coupled to the processor, and a thermal distribution manager operatively coupled to the processor to: receive information related to a data object and information related to a temperature of each of the plurality of memory devices; and based at least in part on the information related to the data object and the information related to the temperature of each of the plurality of memory devices: allocate multiple data portions of the data object to be written to at least some of the plurality of memory devices; and restore the data object, wherein to restore the data object includes to read the data object from at least some of the allocated multiple data portions from the respective memory devices, wherein the allocation of the multiple data portions is based at least in part on respective temperatures of the memory devices prior to a write time and the reading of the at least some of the allocated data portions is based at least in part on respective temperatures of the memory devices prior to a read time.

Example 16 is the system of Example 15, wherein the plurality of memory devices includes a plurality of solid-state memory drives (SSDs) and the thermal distribution manager is to divide the data object into the multiple data portions based at least in part upon a frequency of access of each of the multiple data portions.

Example 17 is the system of Example 16, wherein the thermal distribution manager is to write the data object across the plurality of memory devices to allow the data object to be read from a first subset of memory devices or a second set of memory devices, and whether the data object is to be read from the first subset or the second subset is based in part on information related to temperatures of the first or the second subset of memory devices.

Example 18 is the system of Example 15, wherein the thermal distribution manager is to read the data object from a first or a second subset of the plurality of memory devices according to a temperature of the first or the second subset of the plurality of memory devices.

Example 19 is the system of Example 15, wherein the thermal distribution manager is allocate the multiple data portions based at least in part on a natural thermal variance of each of the plurality of memory devices relative to a natural thermal variance of another of the memory devices in the plurality of memory devices.

Example 20 is the system of any one of Examples 15-19, further comprising a platform device to include the processor, wherein the platform device includes a server, a desktop, a laptop, or other mobile computing device.

Example 21 is a method, comprising receiving information related to a data object to be written to the plurality of SSDs; receiving information related to a temperature of each of the plurality of SSDs; and based at least in part on the information related to the data object and the information related to the temperature of each of the plurality of SSDs, dividing the data object into a plurality of data portions; and allocating each of the data portions in the plurality to be written to a different SSD of the plurality to thermally distribute the data object across the plurality of SSDs.

Example 22 is the method of Example 21, wherein allocating each of the data portions includes to allocate a data portion to an SSD having a lower temperature than another SSD of the plurality to move the plurality of SSDs towards an isothermal condition.

Example 23 includes an apparatus comprising means for performing the method of any one of Examples 21 and 22, or some other example herein.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to specific implementations disclosed in the specification and the claims. Rather, the scope is to be determined entirely by the following claims, which are to be construed in accordance with established doctrines of claim interpretation.

What is claimed is:

1. An apparatus, comprising:
a processor;
a thermal distribution manager operatively coupled to a plurality of memory devices and operated by the processor to:
allocate multiple data portions comprising a data object to be written into at least some of the plurality of memory devices;
restore the data object, which includes to read at least some of the allocated multiple data portions from respective memory devices, wherein the allocation of the multiple data portions is based at least in part on respective temperatures of the memory devices prior to a write time and to read the at least some of the allocated multiple data portions is based at least in part on respective temperatures of the memory devices prior to a read time and wherein the thermal distribution manager is to allocate the multiple data portions based at least in part on a natural thermal variance of each of the plurality of memory devices determined based at least in part on information obtained during conditions associated with varying platform fan speeds induced by corresponding varying platform workloads.

2. The apparatus of claim 1, wherein the plurality of memory devices comprises a plurality of solid state memory drives (SSDs) and the thermal distribution manager is to perform the allocation of the multiple data portions in response to a write request and to restore the data object in response to a read request.

3. The apparatus of claim 2, wherein the thermal distribution manager is to perform the allocation of the multiple data portions according to a frequency of access of a first data portion relative to a frequency of access of a second data portion.

4. The apparatus of claim 1, wherein the thermal distribution manager to allocate the multiple data portions includes to divide the data object into data portions that are accessed with a relatively higher frequency and data portions that are accessed with a relatively lower frequency.

5. The apparatus of claim 4, wherein the higher frequency data portions and the lower frequency data portions are allocated across the plurality of memory devices to be read from a first subset of memory devices or a second subset of memory devices.

6. The apparatus of claim 1, wherein the conditions associated with the varying platform fan speeds include increasing platform fan speeds accompanied by substitution or running of an iso-workload in place of a real platform workload.

7. The apparatus of claim 1, wherein the thermal distribution manager dynamically collects and maps each of the temperatures of the memory devices to obtain the information related to the natural thermal variance.

8. One or more non-transitory computer-readable media (CRM) comprising instructions that cause a platform device, in response to execution of the instructions by the platform device, to:
receive information related to a data object and information related to temperatures of each of a plurality of memory devices;
based at least in part on the information related to the data object and the information related to temperatures of each of the plurality of memory devices, allocate multiple data portions of the data object to be written to at least some of the plurality of memory devices; and
restore the data object, wherein to restore the data object includes to read the data object from at least some of the allocated multiple data portions from the respective memory devices, wherein the allocation of the multiple data portions is based at least in part on respective temperatures of the memory devices prior to a write time and the reading of the at least some of the allocated data portions is based at least in part on respective temperatures of the memory devices prior to a read time and wherein to allocate the multiple data portions is based at least in part on a natural thermal variance of each of the plurality of memory devices determined based at least in part on information obtained during conditions associated with varying platform fan speeds induced by corresponding varying platform workloads.

9. The one or more CRM of claim 8, further comprising instructions to cause the platform device to prioritize a memory device available for allocation of a data portion according to a temperature of the memory device relative to other memory devices of the plurality to move the plurality of memory devices towards an isothermal condition.

10. The one or more CRM of claim 8, wherein the instructions to cause the platform device to allocate the multiple data portions include instructions to divide the data object into a first subset of data portions having a relatively higher frequency of access and a second subset of data portions having a relatively lower frequency of access, wherein the subsets of data portions associated with the relatively lower frequency of access are associated with a parity restore.

11. The one or more CRM of claim 8, wherein the instructions further include instructions to cause the platform device to issue instructions to read the data object from a subset of a plurality of memory devices having a lower temperature relative to a subset of memory devices having a higher temperature.

12. A system, comprising:
a processor;
a plurality of memory devices coupled to the processor; and
a thermal distribution manager operatively coupled to the processor to:
receive information related to a data object and information related to a temperature of each of the plurality of memory devices; and
based at least in part on the information related to the data object and the information related to the temperature of each of the plurality of memory devices:
allocate multiple data portions of the data object to be written to at least some of the plurality of memory devices; and
restore the data object, wherein to restore the data object includes to read the data object from at least some of the allocated multiple data portions from the respective memory devices, wherein the allocation of the multiple data portions is based at least in part on respective temperatures of the memory devices prior to a write time and the reading of the at least some of the allocated data portions is based at least in part on respective temperatures of the memory devices prior to a read time and wherein the thermal distribution manager is to allocate the multiple data portions based at least in part on a natural thermal variance of each of the plurality of memory devices based at least in part on information obtained during conditions associated with varying platform fan speeds induced by corresponding varying platform workloads.

13. The system of claim 12, wherein the plurality of memory devices includes a plurality of solid-state memory drives (SSDs) and the thermal distribution manager is to divide the data object into the multiple data portions based at least in part upon a frequency of access of each of the multiple data portions.

14. The system of claim 13, wherein the thermal distribution manager is to write the data object across the plurality of memory devices to allow the data object to be read from a first subset of memory devices or a second subset of memory devices, and whether the data object is to be read from the first subset or the second subset is based in part on information related to temperatures of the first or the second subset of memory devices.

15. The system of claim 12, wherein the thermal distribution manager is to read the data object from a first or a second subset of the plurality of memory devices according to a temperature of the first or the second subset of the plurality of memory devices.

16. The system of claim 12, wherein the thermal distribution manager is to allocate the multiple data portions based at least in part on a natural thermal variance of each of the plurality of memory devices relative to a natural thermal variance of another of the memory devices in the plurality of memory devices.

17. The system of claim 12, further comprising a platform device to include the processor, wherein the platform device includes a server, a desktop, a laptop, or another mobile computing device.

* * * * *